UNITED STATES PATENT OFFICE.

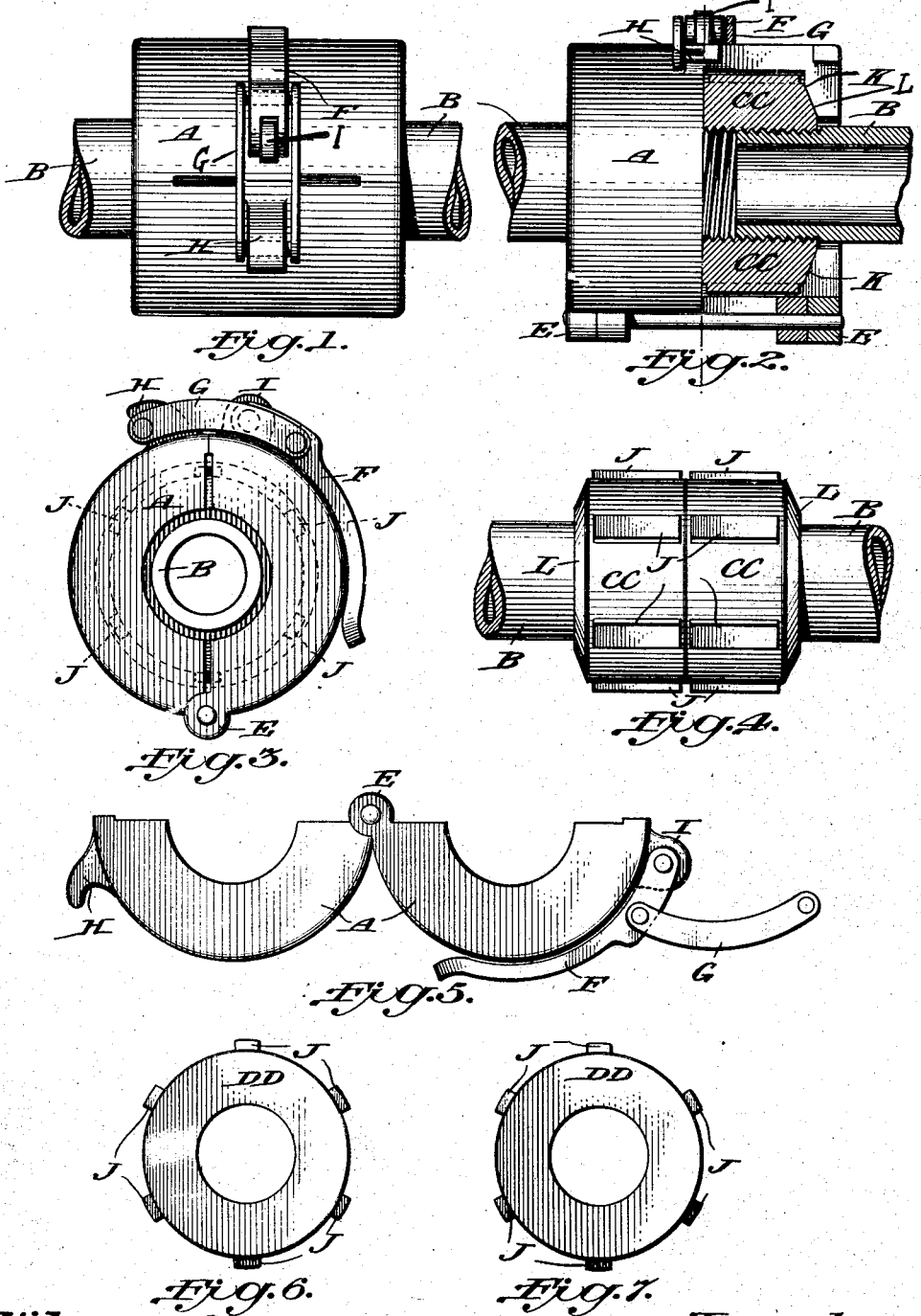

ALFRED E. HYLAND, OF BARRE, VERMONT.

COUPLING FOR PIPE, HOSE, SHAFTS, &c.

1,162,362.   Specification of Letters Patent.   Patented Nov. 30, 1915.

Application filed June 26, 1912. Serial No. 706,060.

*To all whom it may concern:*

Be it known that I, ALFRED E. HYLAND, a citizen of the United States of America, and a resident of Barre, county of Washington, State of Vermont, have invented certain new and useful Improvements in Couplings for Pipe, Hose, Shafts, &c., of which the following is a full and clear specification, reference being had to the accompanying drawings, in which—

Figure 1 is a side elevation of the closed coupling; Fig. 2 is a half side elevation and half longitudinal section of the coupling box and pipe; Fig. 3 is an end view of the coupling in locked position; Fig. 4 is a view of the two flange members in assembled position; Fig. 5 is a view of the housing of the coupling in open position; and Figs. 6 and 7 show the coacting faces of the two flange members.

My invention is designed to produce a simple device for coupling pipes, etc., the construction being such that an instantaneous and easy coupling and uncoupling may be effected without the use of a pipe wrench or other tool.

In the drawing, B designates the two sections of pipe or other members that are to be coupled together and CC designate an annular flange which is screwed or otherwise affixed to the end of each of said members, this annular flange having its outer annular face DD ground to provide a close joint and also having its rear face or edge beveled at L to provide an annular cam surface. Each of these flanges is also provided on its circumferential face with a plurality of transverse ribs J extending practically the full width of the flange, the object of these ribs being to prevent injury by bruising of the faces L and DD should the pipe be dropped or thrown down in shipment or handling. These ribs also provide a protection for the faces during the act of screwing the flange to the pipe or shaft.

The two ground faces DD of the flanges, when fitted together, form an absolutely water-tight joint, if ground true, and in order to press these two faces together rigidly I provide a coupling box consisting of two semi-cylindrical members A which are adapted to entirely envelop the two abutted flanges; these two boxes being hinged together at E and having their opposite abutting edges clamped and locked together by a suitable quick-acting lever mechanism.

I prefer the form of lever mechanism shown, in which a curved lever F is pivoted to a lug I on one of the boxes, this lever being provided with a curved link G which is adapted to engage over a hook-lug H formed on the other box. With this lever and link device, it will be seen that a single half turn of the lever locks the coupling firmly and holds it until released, and that by swinging the lever in the opposite direction the locking device will be released and the two sections of the pipe or shaft will be free to be separated. It will be seen, therefore, that the coupling may be quickly and easily connected up and disconnected, and it will be further seen that by my construction corrosion or extremes of heat and cold will not interfere with instantaneous locking or unlocking of the coupling.

The end walls of the coupling box on their interior are each provided with an annular inwardly facing beveled face K which is adapted to fit against the adjacent similarly beveled face L on one of the flanges and thus act in the manner of cams to draw the two flanges into hard contact at their annular faces DD.

Having thus described my invention, what I claim is:

In combination with the two pipes or other members to be connected, an annular flange affixed to the end of each member, said flange having a front ground face and a rear annular beveled face and also having a plurality of spaced transverse ribs on its circumferential face, a coupling box consisting of a pair of semi-cylindrical sections adapted to embrace the box, the interior of the box being provided with inwardly facing annular faces adapted to engage the beveled inner ends of said flanges, and means for clamping the two box sections together.

ALFRED E. HYLAND.

Witnesses:
BERNARD P. LEWIS,
RICHARD HOAR.